(12) United States Patent
Elftmann, Jr.

(10) Patent No.: US 11,691,558 B2
(45) Date of Patent: Jul. 4, 2023

(54) LOAD SECURING TIE DOWN CLAMP

(71) Applicant: Arthur Joseph Elftmann, Jr., Glendale, AZ (US)

(72) Inventor: Arthur Joseph Elftmann, Jr., Glendale, AZ (US)

(*) Notice: Subject to any disclaimer, the term of this patent is extended or adjusted under 35 U.S.C. 154(b) by 0 days.

(21) Appl. No.: 17/529,432

(22) Filed: Nov. 18, 2021

(65) Prior Publication Data
US 2022/0153183 A1 May 19, 2022

Related U.S. Application Data

(60) Provisional application No. 63/173,331, filed on Apr. 9, 2021, provisional application No. 63/116,117, filed on Nov. 19, 2020.

(51) Int. Cl.
*B60P 7/08* (2006.01)

(52) U.S. Cl.
CPC .................. *B60P 7/0807* (2013.01)

(58) Field of Classification Search
CPC ................. B60P 7/08; B60P 7/0807
USPC ................ 410/106; 123/90.44, 90.16, 90.27
See application file for complete search history.

(56) References Cited

U.S. PATENT DOCUMENTS

| | | | | |
|---|---|---|---|---|
| 3,728,538 A * | 4/1973 | Bailly | ...................... | B60Q 1/11 |
| | | | | 362/469 |
| 8,607,753 B2 * | 12/2013 | Krause | .................... | F01L 1/185 |
| | | | | 123/90.44 |
| 9,482,251 B2 | 11/2016 | Moine et al. | | |
| 2007/0006837 A1 * | 1/2007 | Seitz | ....................... | F01L 1/185 |
| | | | | 123/90.39 |
| 2020/0164232 A1 * | 5/2020 | Mathe | ....................... | A62B 1/14 |
| 2020/0324032 A1 * | 10/2020 | Sauer | .................. | A61M 60/863 |

OTHER PUBLICATIONS

Office Action, Canadian Patent Application No. 3,140,487, (dated Jan. 26, 2023).

* cited by examiner

*Primary Examiner* — Paul N Dickson
*Assistant Examiner* — Sunsurraye Westbrook
(74) *Attorney, Agent, or Firm* — The Law Offices of Lisa & Lesko, LLC; Justin J. Lesko, Esq.

(57) ABSTRACT

A tie down clamp comprises two U-shaped pieces interconnected via roll pins or similar mechanisms, wherein a cam arm is pivotally mounted on an axle between the two U-Shaped pieces. A double torsion spring wraps around the axle with the "hook" of the spring pressing against the cam arm when engaged. The cam arm includes a bore sized to accommodate a hook as may be found on a load securing mechanism. The bore may be beveled on each side to prevent "sharp edges" from being formed by the load securing mechanism. The bore is close to the pivot point of the cam arm. The cam arm includes a protrusion at the bottom so that the point of contact with the trailer angle iron, when the cam arm is engaged, is toward the end of the cam arm and offset from the vertical plane that runs through the axle roll pin.

15 Claims, 20 Drawing Sheets

LOAD SECURING TIE DOWN CLAMP

CROSS REFERENCE TO RELATED APPLICATIONS

This application claims the benefit of Provisional Application No. 63/116,117 filed on Nov. 19, 2020, which is hereby incorporated by reference in its entirety. This application also claims the benefit of Provisional Application No. 63/173,331 filed on Apr. 9, 2021, which is hereby incorporated by reference in its entirety.

BACKGROUND OF THE INVENTION

This is a clamp for use in securing a load that is being restrained by a strap, chain, cable, rope, or other load restraining apparatus. The restraining apparatus will have an end effector, such as a hook, integral or attached to it. The hook will hook into or hook onto the load securing tie down clamp presented here. The tie down clamp is formed to fit around a flat host, or a formed host, usually, for instance, a section of angle iron as may be found on a utility trailer.

It is known to provide a tie down apparatus that interfaces with a trailer element. In most cases the tie down element is a generally flat stock element having a bent over portion designed to hook onto a bracket or attachment point integral with a trailer. There are many variations on this theme. Included are near full circle brackets that are tensioned in place with a bolt and fastener assembly that bring the ends of the bracket together. Yakama (trademark) has rack systems that use near full circle brackets to attach accessories to a round bar element of its system.

It is also known to have bollards or cleats that are used as tie down points in a trailer situation.

The applicant is not aware of any tie down clamps of the type presented here. These clamps not only accept tie down straps but also removably mount to a trailer, truck, vehicles, or stationary apparatus, so that the clamps can be moved from location to location on the host and secured in place.

SUMMARY OF THE INVENTION

A tie down clamp comprises two U-shaped pieces with interconnection via roll pins or other similar mechanisms, wherein a cam arm is pivotally mounted on an axle between the two U-Shaped pieces. A double torsion spring wraps around the axle on both sides of the cam arm with the "hook" of the spring pressing against the cam arm when engaged. The cam arm includes a hook accommodating bore sized to accommodate a hook as may be found on a load securing strap or other load securing mechanism. The hook accommodating bore may be beveled on each side to prevent "sharp edges" from being formed by the load securing mechanism that is attached to the hook accommodating bore. The hook accommodating bore is close to the pivot point of the cam arm to reduce the moment arm created by the hook when the tie down clamp is in use, thereby reducing the chance of failure or bending at the hook accommodating bore and increasing the strength rating of the tie down clamp.

In some embodiments, the cam arm includes a slight protrusion at the bottom so that the point of contact with the trailer angle iron, when the cam arm is engaged, is toward the end of the cam arm and offset from the vertical plane that runs through the axle roll pin. This is a better position for the point of contact, because when the point of contact is directly under the axle roll pin or closer to the axle roll pin, extra pressure is felt by the axle roll pin, causing the tie down clamp to fail (or bend) at the axle roll pin sooner.

Objects and advantages pertaining to tie down clamp may become apparent upon referring to the example embodiments illustrated in the drawings and disclosed in the following written description or appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects and applications of the invention presented here are described below in the drawings and detailed description of the invention.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

Figure 1:
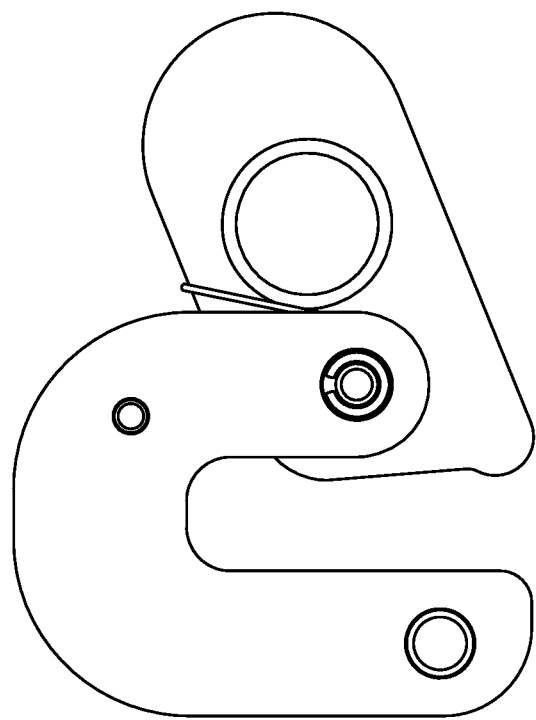
FIG. 1 is a side view of the load securing tie down clamp.
Figure 2:
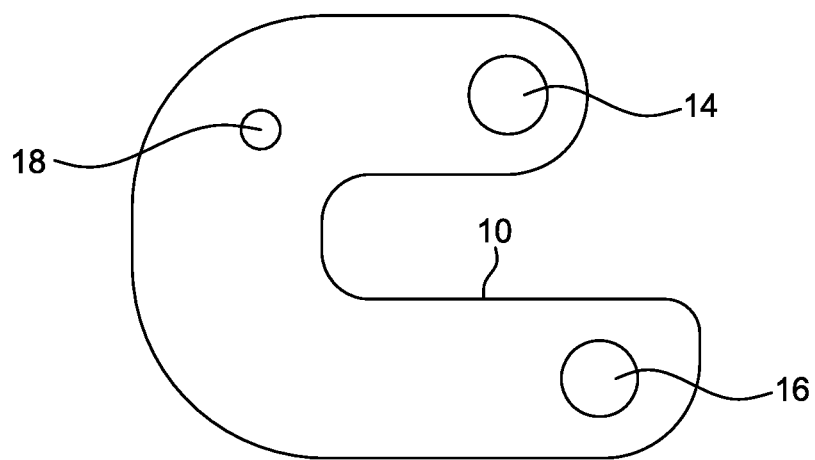
FIG. 2 is a side view of a U-shaped piece used to form the sides of the tie down clamp.
Figure 3:
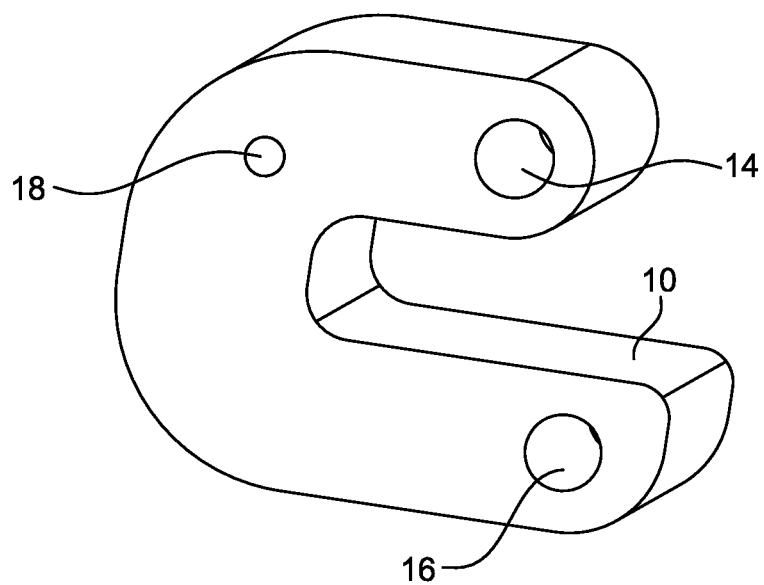
FIG. 3 is an isometric view of a U-shaped piece used to form the sides of the tie down clamp.
Figure 4:
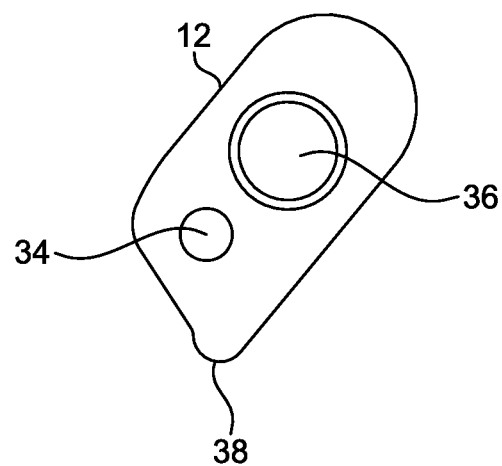
FIG. 4 is a side view of the cam arm used in the tie down clamp.
Figure 5:
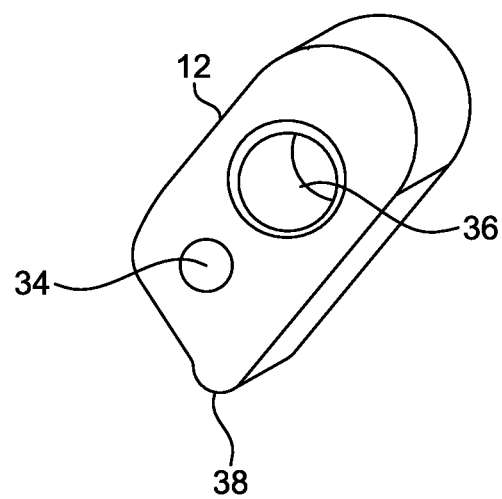
FIG. 5 is an isometric view of the cam arm used in the tie down clamp.
Figure 6:
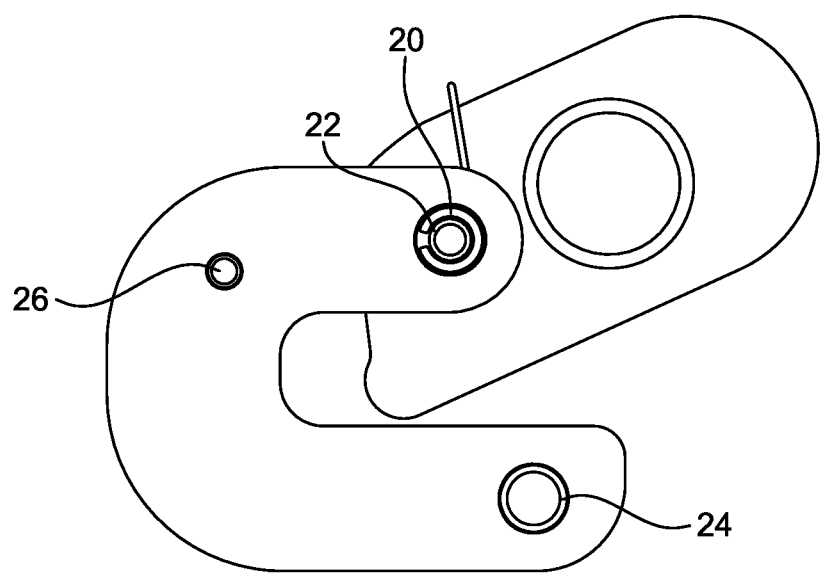
FIG. 6 is a side view of the assembled tie down clamp, not engaged.

Elements and acts in the figures are illustrated for simplicity and have not necessarily been rendered according to any particular sequence or embodiment.

Embodiments depicted are shown only schematically, and not all features may be shown in full detail or in proper proportion. Certain features or structures may be exaggerated relative to others for clarity. The embodiments shown are examples only, and should not be construed as limiting the scope of the present disclosure or appended claims.

DETAILED DESCRIPTION OF SELECTED EMBODIMENTS

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

The example shown in the figures comprises a "cam clamp" with a "U-shaped" body. The lower leg of the U-shaped body is longer than the upper leg. In the example shown in the figures, the U-Shaped body is formed by two U-shaped pieces (10), with each U-shaped piece having three slots (14, 16, and 18). In the example, the three slots on each U-shaped piece receive roll pins that connect the two U-shaped pieces and form the cam clamp. A first roll pin 20 is inserted in the slots 14 on the upper legs of the two U-shaped pieces, and that roll pin 20 acts as an "axle" for the cam arm 12. The cam arm 12 is pivotally mounted on that axle 20 as is shown in the figures. In the example shown in the figures, a second roll pin 22 is inserted inside of that roll pin 20 to strengthen the axle, because the axle is subject to force when the clamp is in use. For example, if the axle roll pin 20 is ¼" in diameter and 1.25" long, a 5/32" diameter and 1.25" long roll pin 22 is inserted inside of it to strengthen the axle. Or if the axle roll pin 20 is 5/8" in diameter and 1.25" long, a ½" diameter and 1.25" long roll pin 22 is inserted inside of it to strengthen the axle. This second roll pin 22 can be optionally excluded in some embodiments (for example, lighter applications). A third roll pin 24 is inserted into the slots 16 of the lower legs of the two U-shaped pieces to hold them together. In the example shown in the figures, an extra roll pin is not inserted inside of that third roll pin 24 to strengthen it, although that may be desired in some embodiments. A fourth roll pin 26 (which is smaller than the other roll pins, in the example) is inserted into the third set of slots 18 to the left of the axle on the upper legs of the U-shaped pieces.

Figure 7:
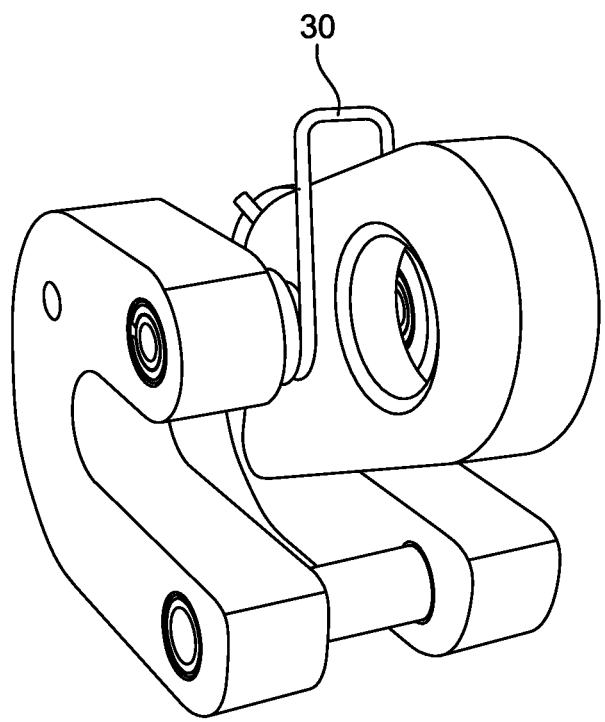
FIG. 7 is a front isometric view of the tie down clamp of FIG. 6.
Figure 8:
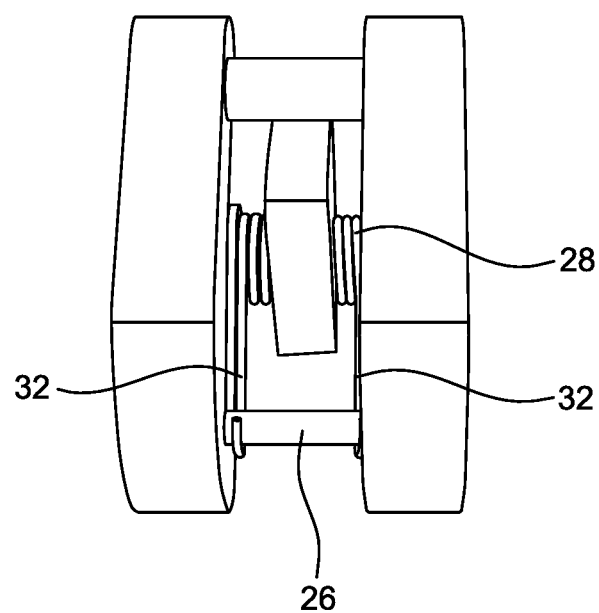
FIG. 8 is a bottom isometric view of the tie down clamp of FIG. 6.
Figure 9:
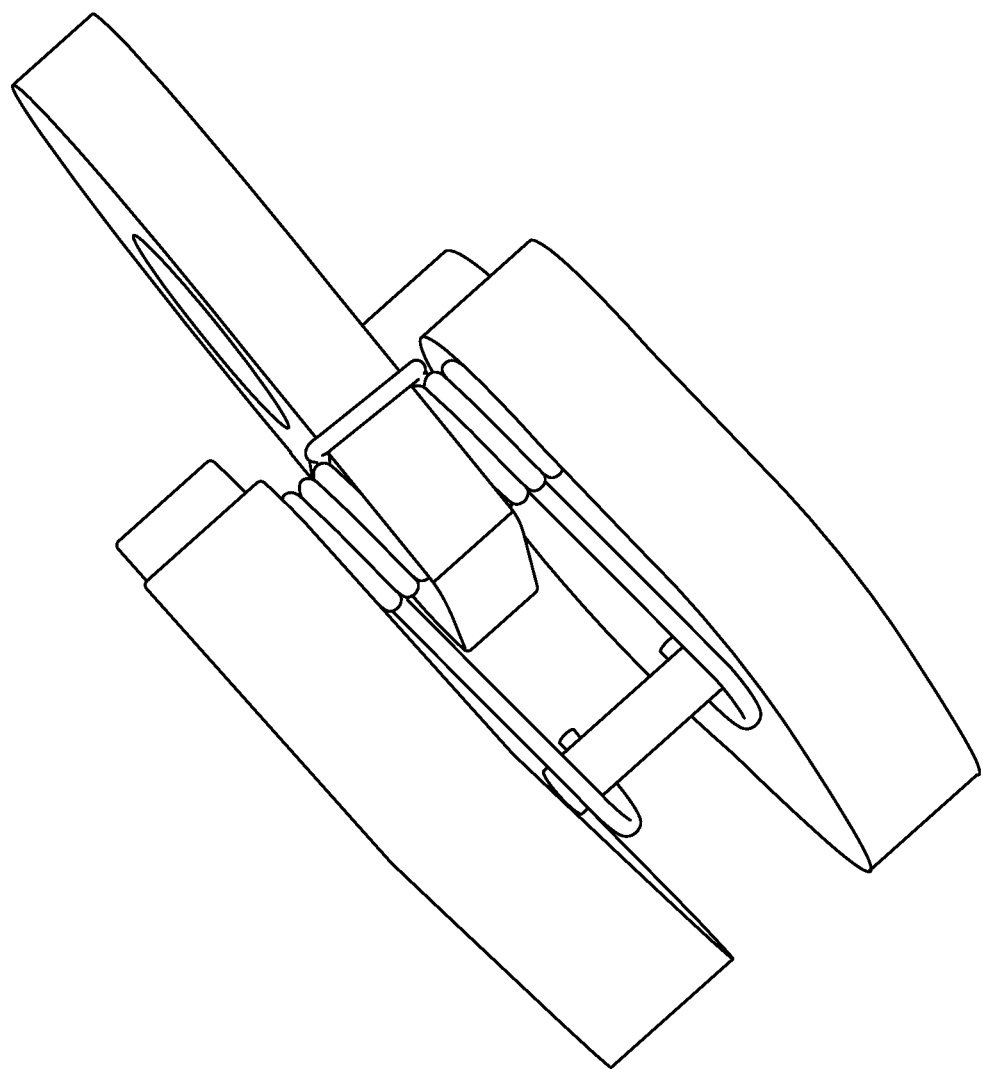
FIG. 9 is a top isometric view of the tie down clamp of FIG. 6.
Figure 10:
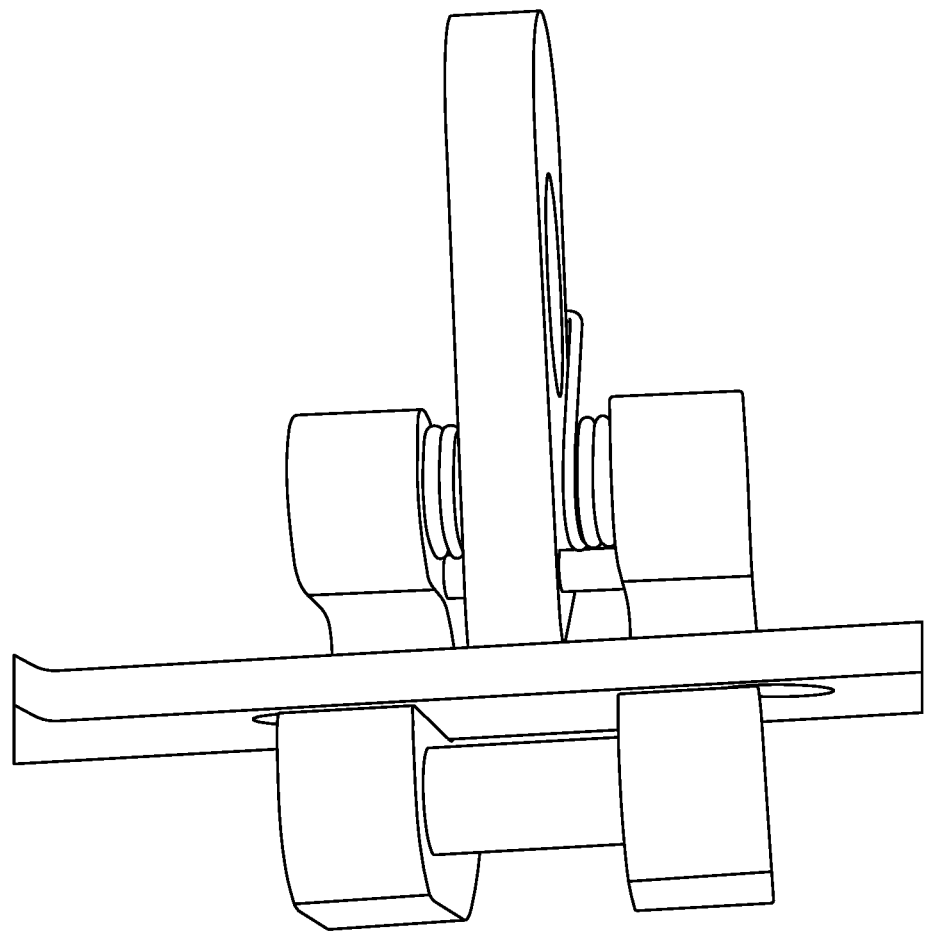
FIG. 10 is a front view of the tie down clamp of FIG. 6, engaged to a piece of iron.
Figure 11:
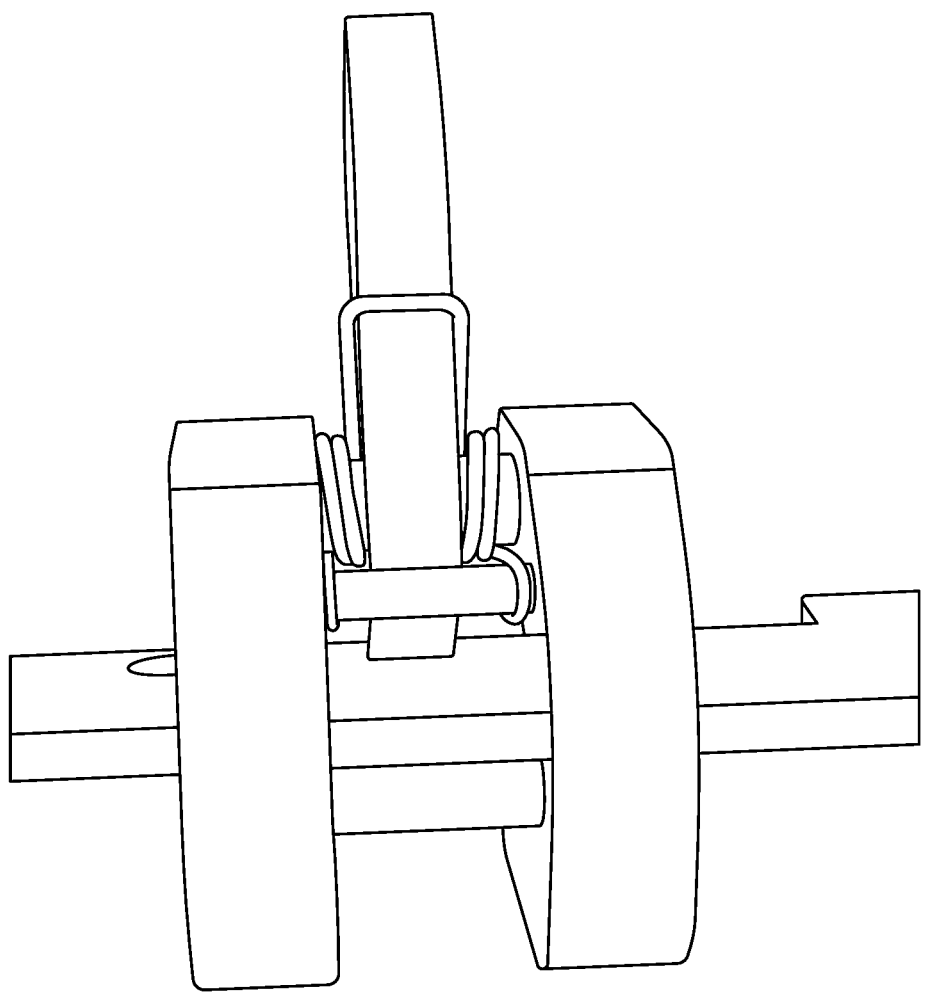
FIG. 11 is a back view of the tie down clamp of FIG. 6, engaged to a piece of iron.
Figure 12:
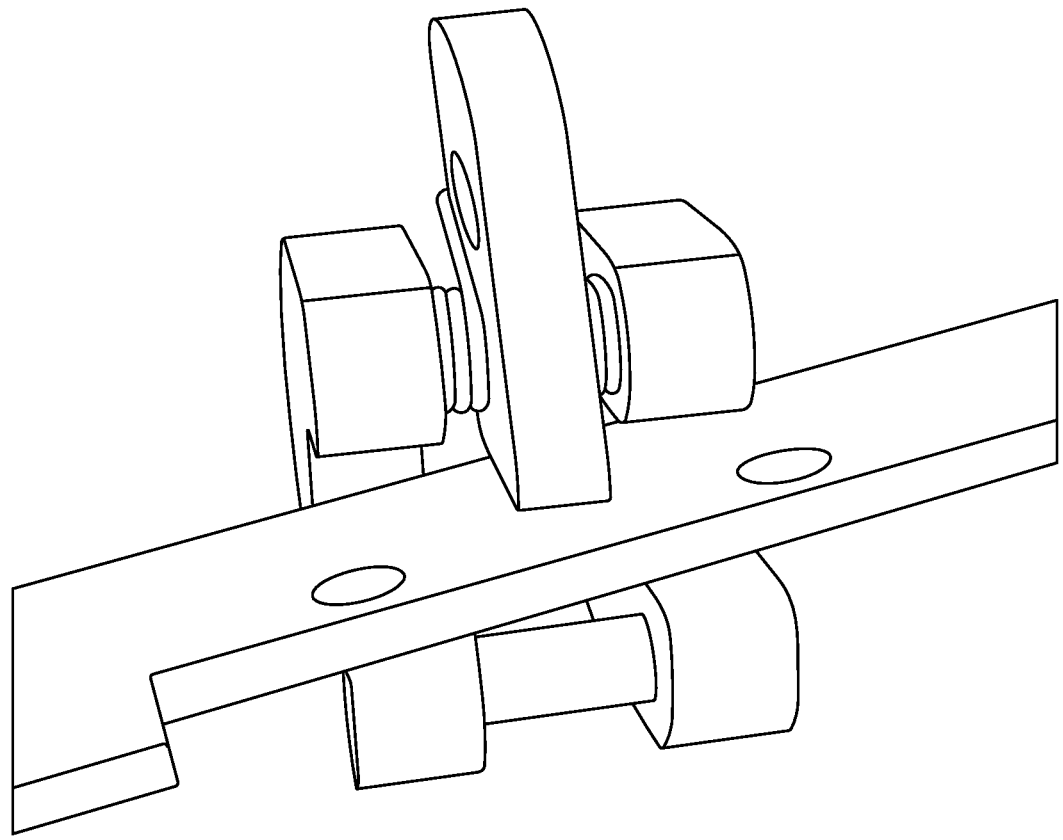
FIG. 12 is a front isometric view of the tie down clamp of FIG. 6, engaged to a piece of iron.
Figure 13:
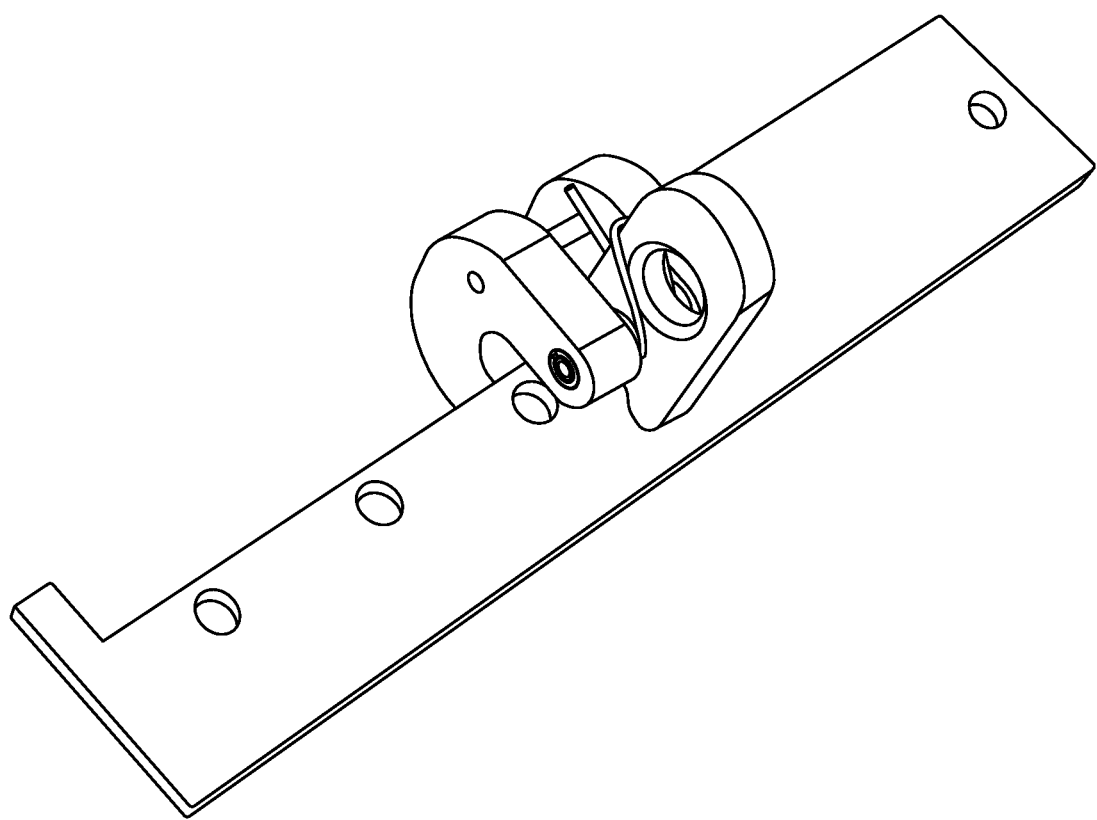
FIG. 13 is a top isometric view of the tie down clamp of FIG. 6, engaged to a piece of iron.
Figure 14:
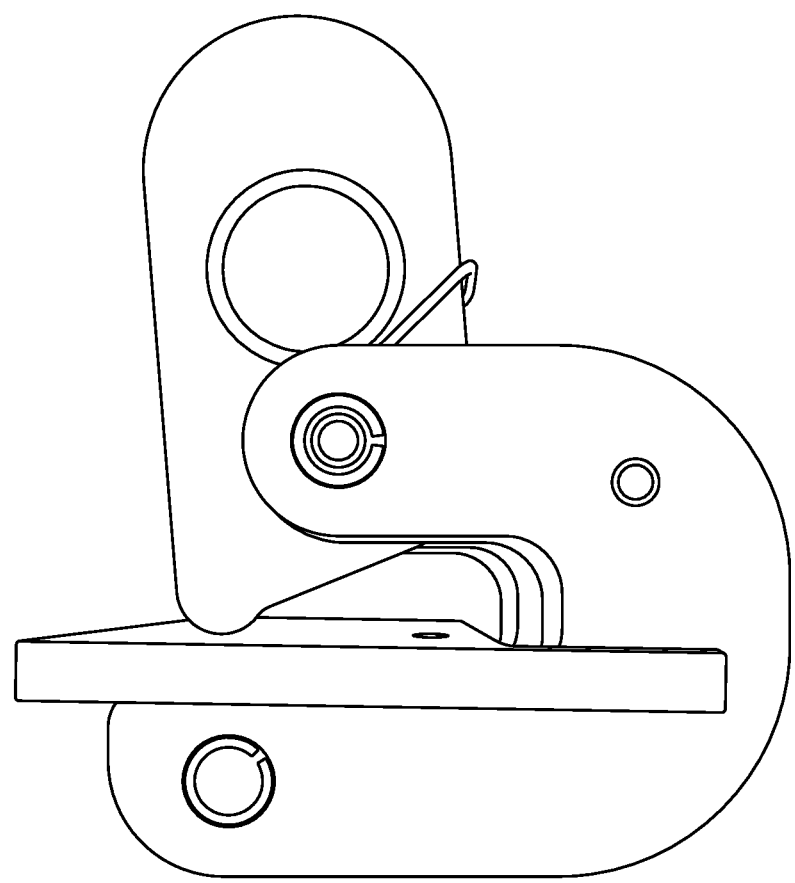
FIG. 14 is a side view of the tie down clamp of FIG. 6, engaged to a piece of iron.
Figure 15:
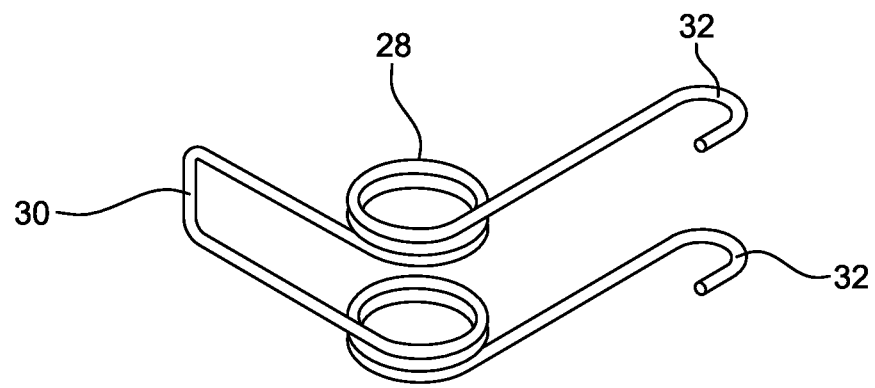
FIG. 15 is a double torsion spring with curved feet for use with the tie down clamp to urge the cam arm forward.
Figure 16:
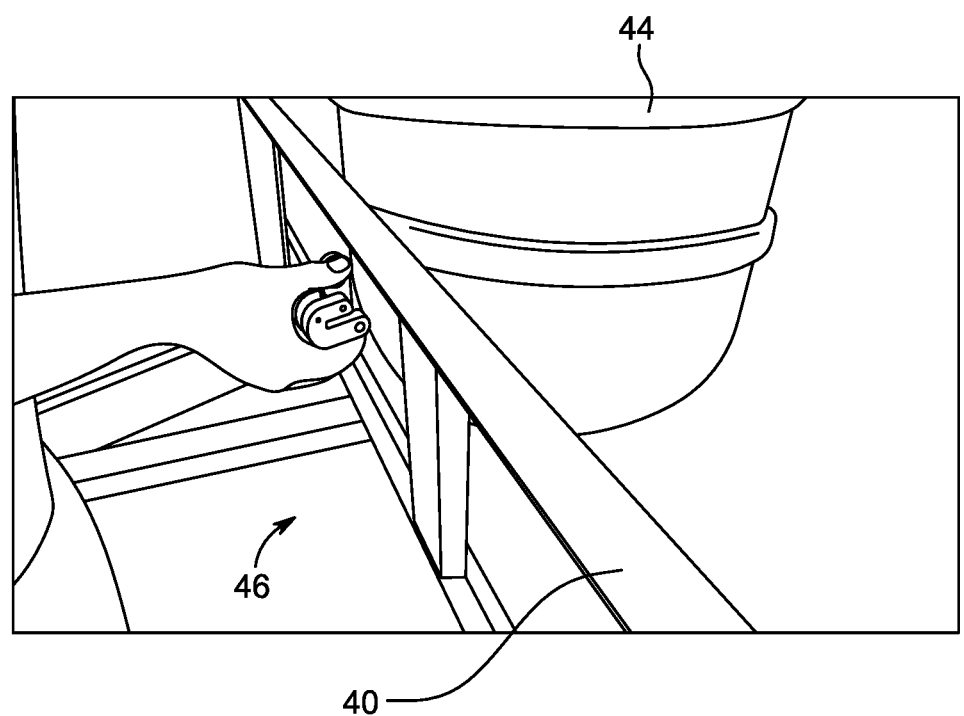
FIG. 16 shows a user pulling back the cam arm to attach the tie down clamp to an angle iron on a trailer.
Figure 17:
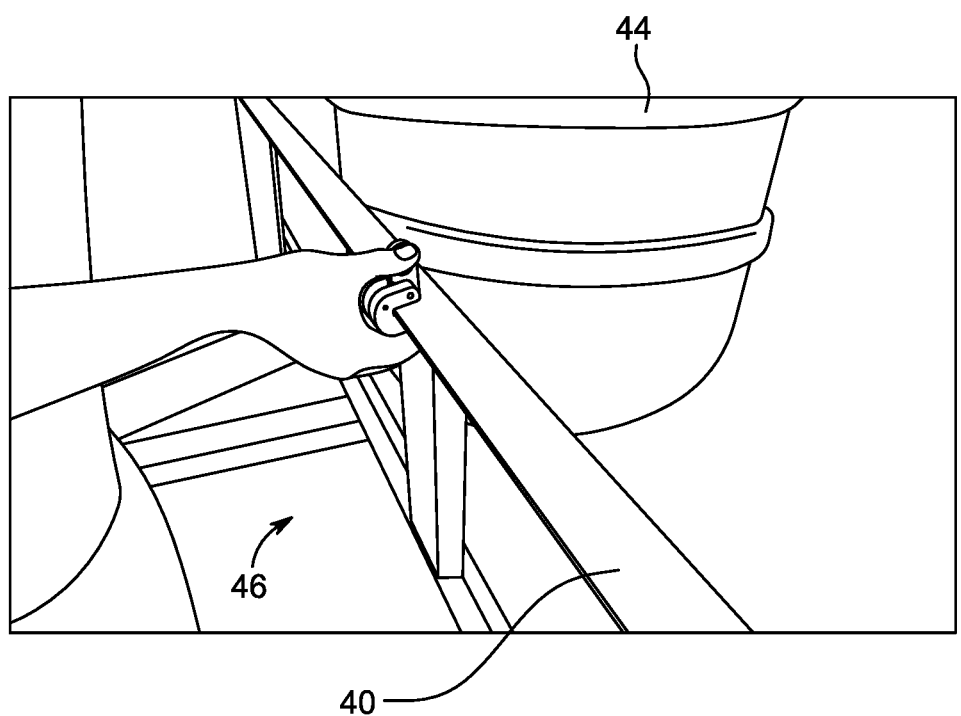
FIG. 17 shows a user attaching the tie down clamp to an angle iron on a trailer.
Figure 18:
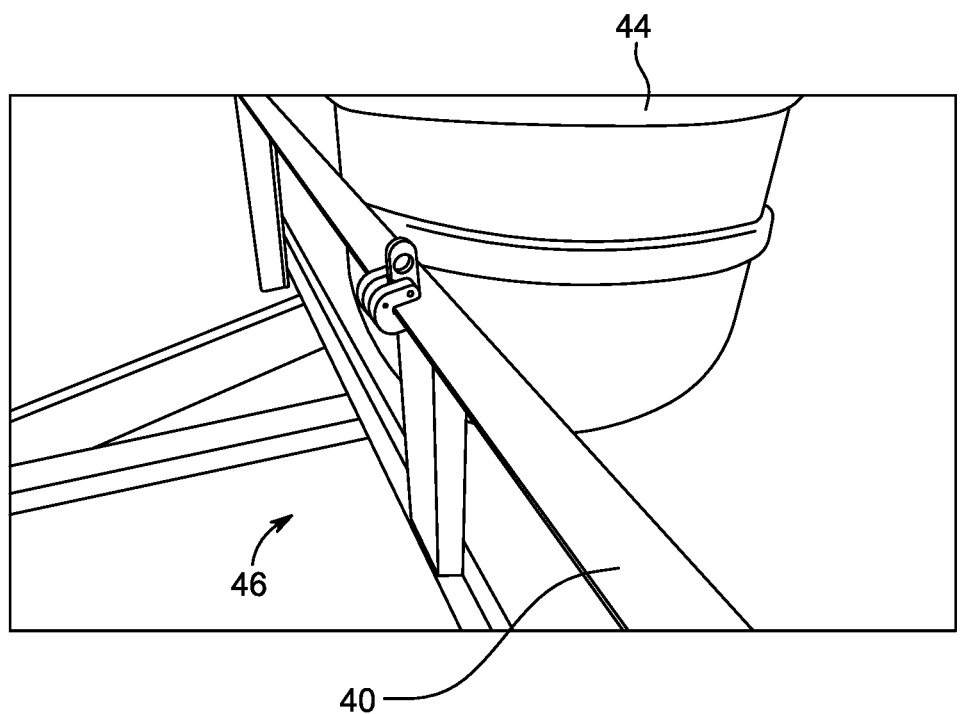
FIG. 18 shows the tie down clamp attached to an angle iron on a trailer.
Figure 19:
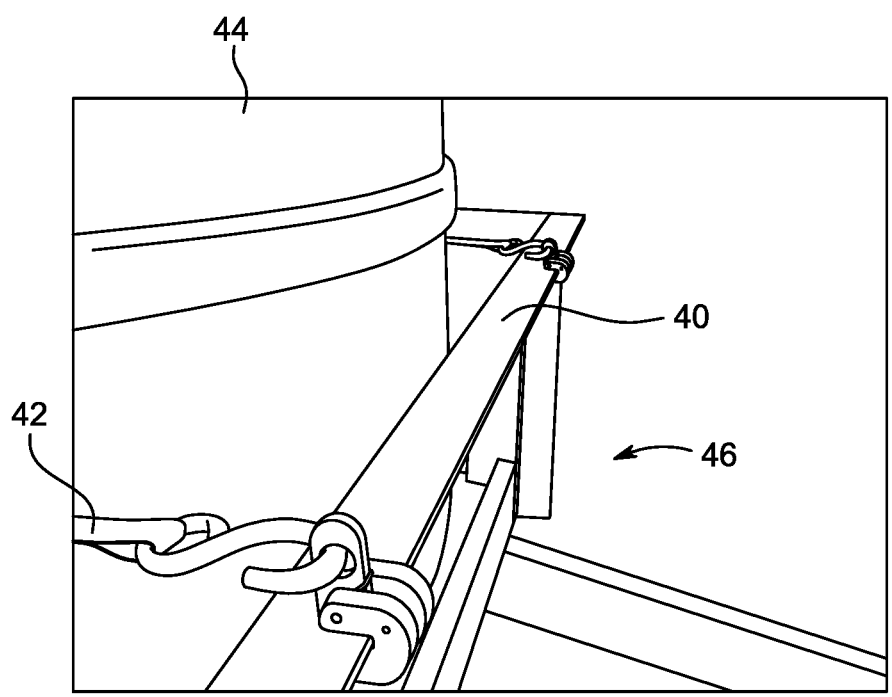
FIG. 19 shows two tie down clamps attached to an angle iron on a trailer, with one hooked end of a load strap attached to each tie down clamp in the pair. The load strap is tightened to secure the load (in this case, a barrel) and also engage the tie down clamps tightly to the angle iron.
Figure 20:
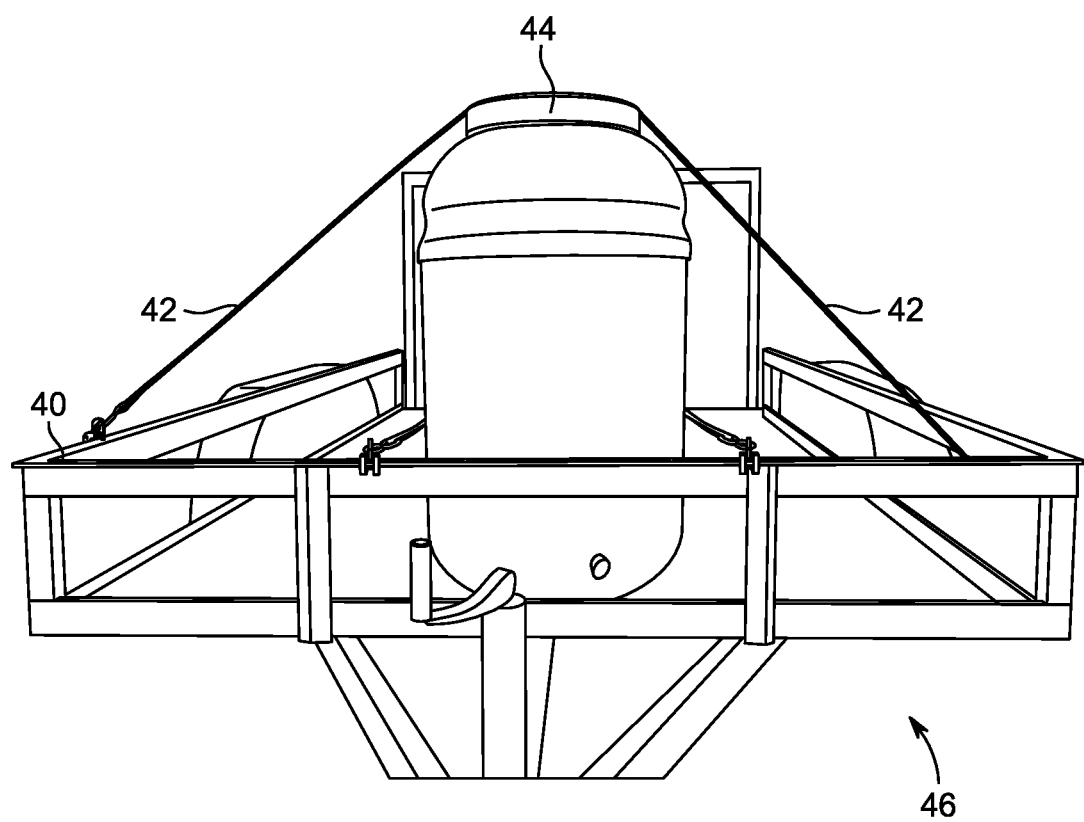
FIG. 20 shows two pairs of tie down clamps securing a barrel to the trailer—one set secures the barrel horizontally (around the barrel), and the other set secures it vertically (over the barrel).
Figure 21:
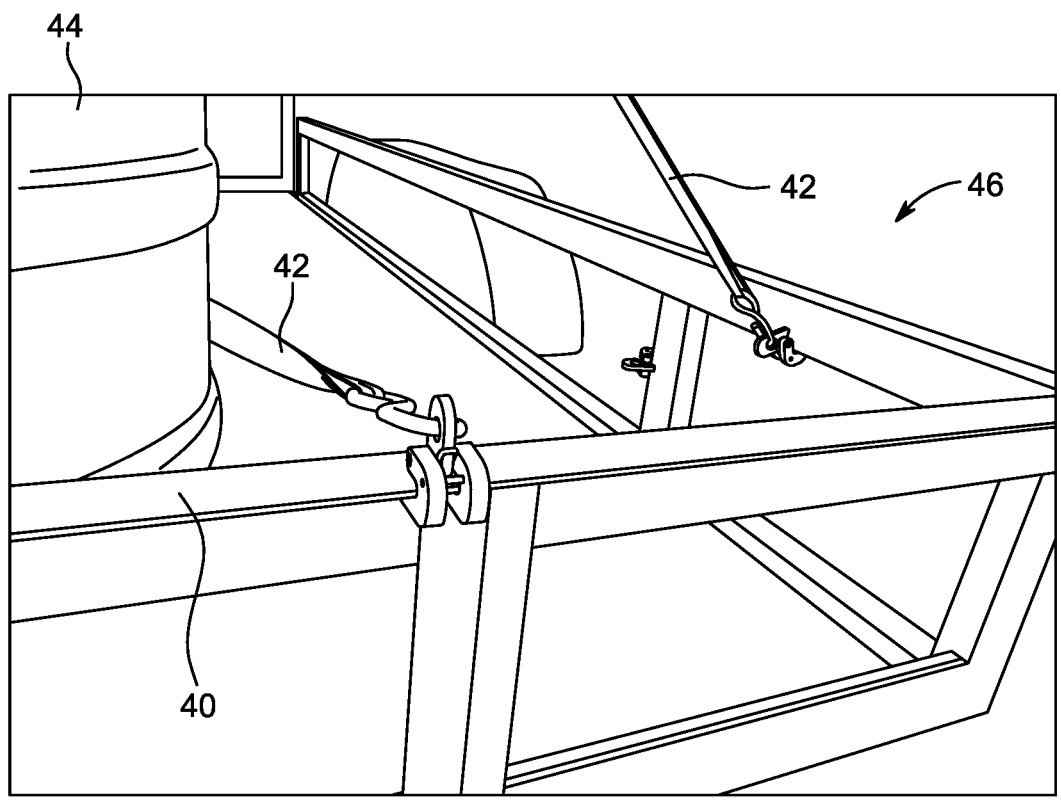
FIG. 21 shows one clamp from each pair of tie down clamps shown in FIG. 20.
Figure 22:
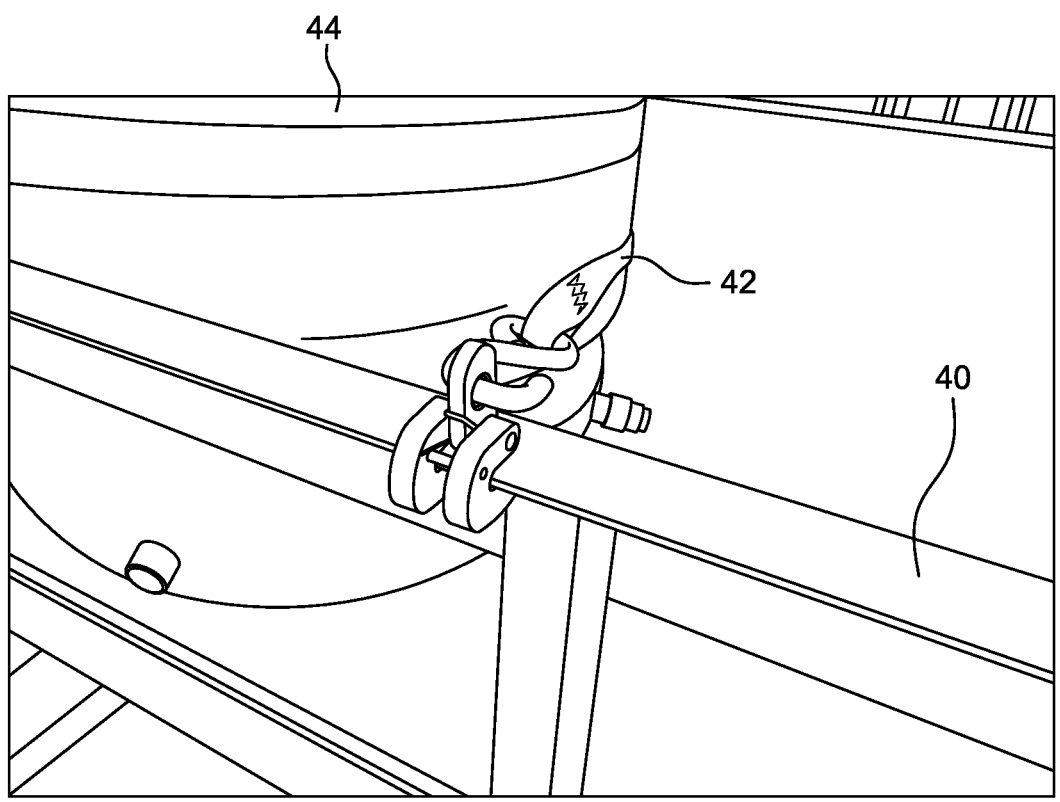
FIG. 22 is a different view of one of the tie down clamps of FIG. 20.
Figure 23:
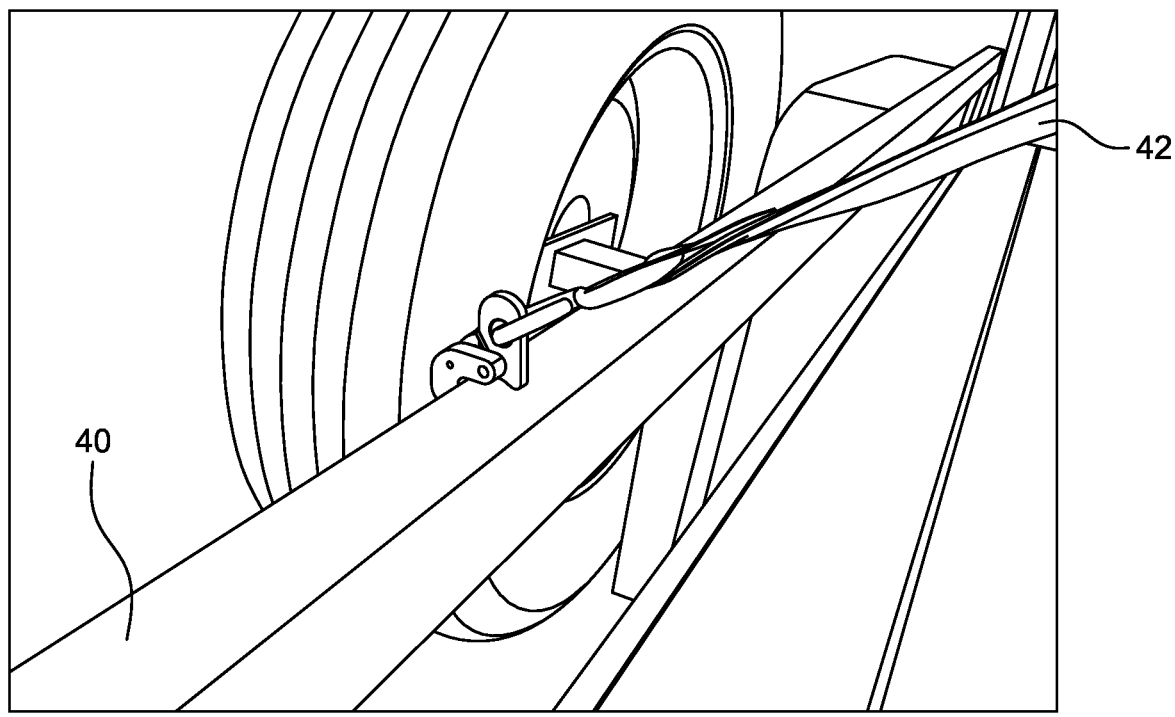
FIG. 23 is another different view of one of the tie down clamps of FIG. 20.

In the example shown in the figures, a double torsion spring 28 wraps around the axle 20 on both sides of the cam arm 12 with the "hook" 30 of the spring pressing against the cam arm 12 when engaged. The spring 28 urges the cam arm 12 to a relatively closed position as shown in the figures. The double torsion spring 28 on both sides, as opposed to a single spring on one side, is more secure, keeps the cam arm 12 centered, and keeps the pressure on the cam arm more even when engaged. A single spring on one side tends to "lean" when the arm the spring is cranked back. In the example shown FIGS. 8, 9, 11, and 15, the feet 32 curve around the small pin to the left of the axle to secure the spring to that small pin, so that the feet of the spring do not flip forward when the cam arm is engaged/disengaged. This acts to prevent a user's hands from being scratched/poked by the feet 32 of the spring 28. As an alternative (shown in FIGS. 7 and 13), the feet 32 of the torsion spring 28 are not curved and rest on the small pin 26 to the left of the axle.

In the example shown in the figures, the cam arm 12 will have two through bores. One bore, the first bore 34, which is an axle accommodating bore, will be sized to allow the cam arm 12 to rotate on the axle 20. Interference between the cam arm and the other non-axle roll pins limits the rotational movement of the cam arm to less than three hundred and sixty degrees.

The second bore 36 in the cam arm is the hook accommodating bore. It is sized to be large enough to accommodate a hook as may be found on a load securing strap of usual size. In the example shown in the figures, the hook accommodating bore 36 is beveled on each side to prevent "sharp edges" from being formed by the strap, chain, cable, rope, or other load restraining apparatus or hook that is attached to the hook accommodating bore when the clamp is in use. A flat, non-beveled edge would be more susceptible to forming a sharp edge when held under tension by a heavy load.

In the example shown in the figures, the hook accommodating bore 36 is placed on the cam arm 12 just above the axle accommodating bore 34, as opposed to be placed higher up on the cam arm. Placing the hook accommodating bore 36 close to the pivot point, as opposed to placing it near the top of the cam arm 12 (i.e., further away from the pivot point), reduces the moment arm created by the hook when the tie down clamp is in use, and for that reason, the pressure on the hook accommodating bore 36 is reduced during use. This reduces the chance of failure or bending at the hook accommodating bore and increases the strength rating of the tie down clamp.

The cam arm 12 includes a slight protrusion 38 at the bottom so that the point of contact with the trailer angle iron, when the cam arm 12 is engaged, is toward the end of the cam arm 12 and offset from the vertical plane that runs through the axle roll pin 20. This is a better position for the point of contact, because when the point of contact is directly under the axle roll pin 20 or closer to the axle roll pin 20, extra pressure is felt by the axle roll pin 20, causing the tie down clamp to fail (or bend) at the axle roll pin sooner. In other words, the offset protrusion 38 results in a higher force rating.

With the arrangement of the hook accommodating bore 36 and cam arm protrusion 38 shown in the figures (and the double roll pins), the tie down clamp withstood about 2,000 pounds of force during testing and did not fail, whereas the previous version of the tie down clamp disclosed in U.S. Provisional Application No. 63/116,117 withstood about 1,250 pounds of force during testing before failure.

To attach the tie down clamp to a piece of angle iron 40, a user simply grips the bottom of the U shaped pieces 10 with fingers, pulls back against the cam arm 12 toward the spring 28 with the user's thumb, puts the U shape portion 10 on the angle iron, and then releases the cam arm 12 and spring 28 so that the cam arm 12 swings forward, and with that, the protrusion 38 and the U 10 engage with opposite sides of the angle iron.

In the example shown in FIGS. 16-23, the tie down clamps are used with tie down straps 42 around a barrel 44 to secure the barrel on a trailer 46. In each instance, two tie down clamps are attached to the angle iron and used as a pair, and then one hooked end of a load strap (or combination of multiple load straps strung together) is attached to each tie down clamp in the pair. The load strap is then tightened to secure the load and also engage the tie down clamps of the pair tightly to the angle iron. As shown, the tie down clamps can be attached to various portions of the trailer angle iron depending on the application—the vertical portion of the top piece of angle iron, the horizontal portion of the top piece of angle iron, the angle irons that vertically support the top piece of angle iron, etc. As shown in the figures, the tie down clamps thereby enable the load straps to wrap both over and around the barrel.

The operation of the tie down clamp has the advantage of tightening the cam once a load is exerted by a load strap hooked into the hook accommodating bore of the cam clamp. Once the hook of the load strap exerts a force on the cam arm the clamp will tighten on the host flat surface (for example, the angle iron).

Aspects of the tie down clamp disclosed herein can be combined with aspects of the tie down clamp disclosed in U.S. Provisional Application No. 63/116,117, and vice versa. For example, the one piece U-shaped body disclosed in U.S. Provisional Application No. 63/116,117 or a similar one piece variation can be used with the cam arm disclosed herein. As another example, a second roll pin for reinforcing the axle on which the cam arm pivots can be used with the cam clip disclosed in U.S. Provisional Application No. 63/116,117, and so can a double torsion spring.

In the foregoing Detailed Description, various features can be grouped together in several example embodiments for the purpose of streamlining the disclosure. This method of disclosure is not to be interpreted as reflecting an intention that any embodiment requires more features than are expressly recited in the corresponding claim. Rather, inventive subject matter may lie in less than all features of a single disclosed example embodiment. Thus, the present disclosure shall also be construed as implicitly disclosing any embodiment having any suitable set of one or more disclosed or claimed features (i.e., a set of features that are neither incompatible nor mutually exclusive) that appear in the present disclosure, including those sets that may not be explicitly disclosed herein.

The scope of the originally filed claims does not necessarily encompass the whole of the subject matter disclosed herein. The originally filed claims are hereby incorporated into the Detailed Description, with each claim standing on its own as a separate disclosed embodiment. The scope of subject matter encompassed by each claim shall be determined by the recitation of only that claim.

The conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. The words "comprising," "including," "having," and variants thereof, wherever they appear, shall be construed as open ended terminology, with the same meaning as if the phrase "at least" were appended after each instance thereof.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessary.

The use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112, ¶6.

What is claimed is:

1. A clamp, comprising:
   a. a first body piece;
   b. a second body piece interconnected to the first body piece via an axle;
   c. a cam arm that rotates on the axle including 1) a protrusion configured to press against a portion of an object and secure the clamp to the portion of the object between the protrusion and the first and second body pieces and 2) a tie down apparatus accommodating bore configured to receive a tie down apparatus; and
   d. a double torsion spring that wraps around the axle between the first body piece and the second body piece and urges the protrusion to press against the portion of the object.

2. The clamp of claim 1, wherein the first body piece and the second body piece are U-shaped.

3. The clamp of claim 2, wherein an upper portion of the U in the U-shape is shorter than a lower portion of the U in the U-shape.

4. The clamp of claim 3, wherein the axle runs through the upper portion of the U in the U-shape.

5. The clamp of claim 1, wherein the tie down apparatus accommodating bore is on a first side of the cam arm and the protrusion is on a second side of the cam arm opposite the first side, with the axle being located between the first side and the second side.

6. The clamp of claim 1, wherein the tie down apparatus accommodating bore is circular with beveled edges.

7. The clamp of claim 1, wherein the double torsion spring includes feet that wrap around a roll pin that interconnects the first body piece to the second body piece.

8. The clamp of claim 1, wherein the axle is a roll pin.

9. The clamp of claim 1, wherein the tie down apparatus is a hook of a tie down strap.

10. The clamp of claim 1, wherein the protrusion is configured to press against the portion of the object at a point of contact that is offset from a vertical plane that runs through the clamp at the axle.

11. The clamp of claim 1, wherein the object is a piece of angle iron on a trailer.

12. The clamp of claim 1, further comprising a roll pin that interconnects the first body piece and the second body piece and is located beneath the protrusion when the clamp is secured to the portion of the object.

13. The clamp of claim 12, further comprising a second roll pin inside of the roll pin.

14. The clamp of claim 1, wherein the axle comprises a first roll pin and a second roll pin inside of the first roll pin.

15. The clamp of claim 1, wherein the protrusion includes a rounded edge in contact with the portion of the object.

\* \* \* \* \*